March 16, 1943.  A. M. GUREWITSCH  2,314,208
SHAFT LOCK
Filed May 8, 1942
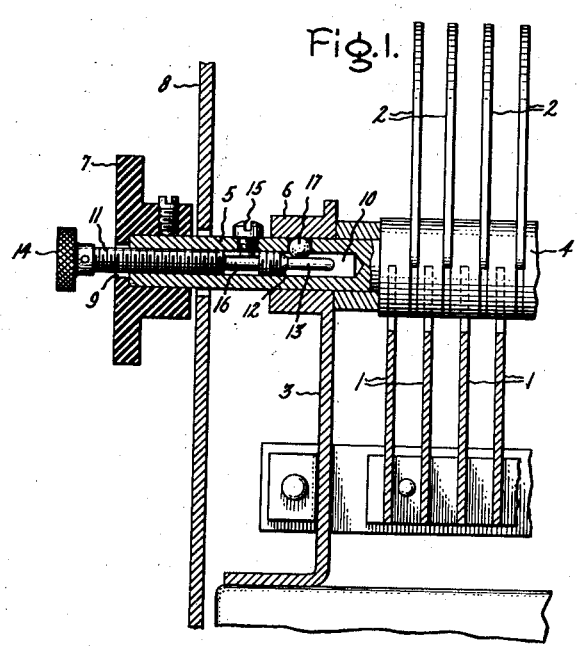
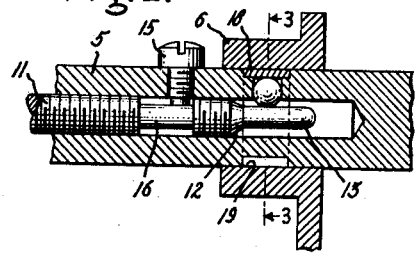
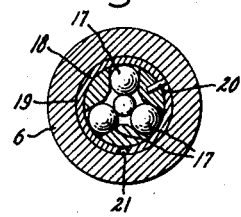
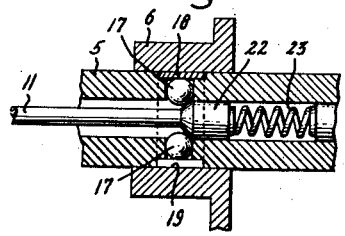
Inventor:
Anatole M. Gurewitsch,
by Harry E. Dunham
His Attorney.

Patented Mar. 16, 1943

2,314,208

UNITED STATES PATENT OFFICE 2,314,208

SHAFT LOCK

Anatole M. Gurewitsch, Schenectady, N. Y., assignor to General Electric Company, a corporation of New York Application May 8, 1942, Serial No. 442,214

6 Claims. (Cl. 287—114)

My invention relates to manual control devices for radio apparatus and particularly to means for locking such control devices after they have been adjusted to a desired position.

It is an object of my invention to provide an improved shaft lock for a control device, for example, a variable capacitor, for radio apparatus.

Another object of the invention is to provide locking means for a control shaft which are concentric with the shaft and which may be easily applied to secure a positive and uniform engagement between the shaft and its supporting bearing without affecting the setting of the control device.

One of the features of my invention is the provision of a lock for a control shaft which is applied by means of an adjustable pin concentric with the shaft and which actuates means attached to the shaft and expansible to a diameter greater than that of the control shaft so that an engagement is made with a supporting bearing surface effectively to prevent rotation.

The features of my invention which I believe to be novel are set forth with particularity in the appended claims. My invention itself, however, together with further objects and advantages thereof, may best be understood by reference to the following description taken in connection with the accompanying drawing, in which Fig. 1 is a side view partly in section of one form of my invention; Fig. 2 is a side view partly in section of a modification of the invention; Fig. 3 is a central vertical sectional view taken on the line 3—3 of Fig. 2; and Fig. 4 is a side view partly in section of another modified form of the invention.

Referring to the drawing, in Fig. 1 is shown a well-known type of variable capacitor for radio apparatus having fixed plates 1 and rotatable plates 2, the fixed plates being supported by a frame member 3 and the rotatable plates being supported by shaft 4. Shaft 4 has a tubular portion 5 supported by a bearing surface 6 in frame member 3. Attached to the shaft 5 in a suitable manner is a control knob 7 for adjusting the capacitor to a desired value, the control knob 7 being shown in the drawing as located in front of a panel 8 of a radio cabinet. Extending through a hole 9 in the control knob and engaging threads on the inner surface of a concentric hole 10 in shaft 5 is a threaded pin member 11 having a tapered portion 12 adjoining the threaded portion with a portion of reduced diameter 13. Rotation of pin member 11 with respect to shaft 5 may be effected by means of a knurled knob 14. The travel of pin member 11 with respect to the tubular shaft 5 is limited by a stop 15, shown as a screw in threaded engagement with a hole in shaft 5. Pin member 11 likewise has a portion 16 of reduced diameter to cooperate with the stop 15. Located in that portion of shaft 5 which is journaled in bearing surface 6 is a hole or recess having positioned in it a ball member 17.

In order to lock the shaft 5 against rotation after the capacitor has been set at a desired position the pin member 11 is screwed into shaft 5 so that the tapered portion 12 contacts the ball member 17. In this manner the ball member is forced into engagement with both the bearing 6 and the wall of the hole or recess in shaft 5, locking the shaft with respect to the frame member 3.

In the modification shown in Fig. 2, a ring member 18 is located in a recess 19 in shaft 5. This ring member may be joined to the shaft, for example, by a pin 20. A slot 21 in the member permits it to expand under internal pressure. As the pin member 11 is screwed into the shaft 5 the tapered portion of the pin engages the ball members 17 and presses them into contact with the inner surface of the ring 18. Expansion of the ring in response to this pressure will lock the shaft with respect to the fixed frame member. By using a plurality of ball members 17, as shown in Fig. 3, a uniform pressure to expand ring 18 is provided.

In the form of the invention shown in Fig. 4, the shaft 5 is normally locked with respect to bearing 6 and the pin member 11 preferably is not in threaded engagement with the tubular portion of shaft 5. Also preferably, member 11 has an enlarged end portion 22 connected with the main portion by a tapered section. End portion 22 is resiliently biased into contact with ball member 17 by means of a spring member 23. In this modification, ring member 18 is normally maintained in an expanded position by spring 23, being released by pressure inwardly on pin member 11.

While I have shown particular embodiments of my invention, it will of course be understood that I do not wish to be limited thereto since various modifications may be made, and I contemplate by the appended claims to cover any such modifications as fall within the true spirit and scope of my invention.

What I claim as new and desire to secure by Letters Patent of the United States, is:

1. The combination with a tuning device for radio apparatus, of a substantially cylindrical control shaft for rotatably adjusting the position of said tuning device, a tubular sleeve portion on said shaft having cylindrical inner and outer surfaces and a recessed portion extending between said surfaces, a stationary bearing surface rotatably engaging a portion of said outer surface and surrounding said recessed portion, a roller member within said recessed portion, a control knob secured to said shaft near the extremity of said tubular portion whereby said shaft normally may be rotated in said bearing surface for adjustment of the position of said device, an adjustable pin member extending within said tubular portion, said pin member having sections of different diameter and a tapered portion connecting said sections, and said device being retained in its adjusted position by longitudinal movement of said pin member to cause said tapered portion to engage said roller member and move said roller member outwardly in said recess, said outward movement being effective to lock said shaft against rotation with respect to said bearing surface.

2. The combination with a control device for radio apparatus, of a shaft having a tubular axial portion for rotatably adjusting said control device, said shaft having a plurality of recesses located in a plane transverse to the axis of said shaft, a slotted ring member surrounding said shaft adjacent said recesses and having a circumference substantially equal to the outer circumference of said shaft, a frame member having a bearing surface surrounding said ring member for supporting said shaft, a movable member located in said recesses, and means extending within said tubular portion for moving said movable member outwardly to press said ring member into engagement with said bearing surface, whereby said shaft is locked against rotation.

3. The combination with a control device having a tubular axial shaft for rotatably adjusting said control device, said shaft having a plurality of recesses located in a plane transverse to the axis of said shaft, a slotted ring member surrounding said shaft adjacent said recesses and having a circumference substantially equal to the outer circumference of said shaft, a frame member having a bearing surface surrounding said ring member for supporting said shaft, a pin member extending within said tubular shaft, said pin member having a tapered portion, a plurality of movable members located in said recesses and engaging both said tapered portion and said ring member, and means whereby said pin member may be moved with respect to said movable members, thereby to expand said ring member and prevent rotation between said shaft and said bearing surface.

4. The combination with a control device for radio apparatus, of a frame member having a bearing surface, a shaft having a tubular axial portion journaled in said bearing surface for rotatably adjusting said device, said shaft having a recessed portion, a ring member surrounding said shaft at said recessed portion and forming at least a portion of a journal cooperating with said bearing surface, a pin member extending within said tubular portion of said shaft and having a portion of reduced diameter underlying said recessed portion of said shaft and a tapered portion adjacent said portion of reduced diameter, a plurality of ball members lying between said ring member and said portion of reduced diameter, and means for resiliently maintaining engagement between said tapered portion and said ball members, whereby said ball members press said ring member into engagement with said bearing surface to prevent rotation of said shaft.

5. The combination with a control device for radio apparatus, of a frame member having a bearing surface, a shaft having a tubular axial portion journaled in said bearing surface for rotatably adjusting said device, said shaft having a recessed portion, a ring member surrounding said shaft at said recessed portion and forming at least a portion of a journal cooperating with said bearing surface, a pin member extending within said tubular portion of said shaft and having a portion of reduced diameter underlying said recessed portion of said shaft and a tapered portion adjacent said portion of reduced diameter, a plurality of ball members lying between said ring member and said portion of reduced diameter, said pin member being received in threaded relation with the inner surface of said tubular portion, and means whereby the position of said pin member may be adjusted, whereby said tapered portion adjustably varies the contact between said ball members and said ring member to cause locking engagement between said ring member and said bearing surface.

6. The combination with a control device having a tubular axial shaft for rotatably adjusting said control device, said shaft having a recess located in a plane transverse to the axis of said shaft and extending between the inner and outer surfaces of said tubular shaft, a frame member having a bearing surface for rotatably supporting said shaft, a control knob secured to said shaft near one extremity thereof, whereby said shaft normally may be rotated in said bearing surface for adjustment of the position of said device, and means for substantially locking said shaft against rotation with respect to said frame member, said means comprising a movable member located in said recess, a pin member extending within said tubular shaft, said pin member having sections of different diameter and a tapered portion connecting said sections for engaging said movable member, and means whereby said pin member may be moved relative to said movable member thereby to cause said movable member to move outwardly in said recess.

ANATOLE M. GUREWITSCH.